Feb. 20, 1934.  W. F. FEYRER  1,947,980
COLLAPSIBLE SEAT FOR VEHICLES
Filed Sept. 18, 1928    3 Sheets-Sheet 1

INVENTOR.
William F. Feyrer

Feb. 20, 1934.  W. F. FEYRER  1,947,980
COLLAPSIBLE SEAT FOR VEHICLES
Filed Sept. 18, 1928  3 Sheets-Sheet 2

INVENTOR.
William F. Feyrer

Feb. 20, 1934.   W. F. FEYRER   1,947,980
COLLAPSIBLE SEAT FOR VEHICLES
Filed Sept. 18, 1928   3 Sheets-Sheet 3

INVENTOR.
William F. Feyrer

Patented Feb. 20, 1934

1,947,980

UNITED STATES PATENT OFFICE 1,947,980

COLLAPSIBLE SEAT FOR VEHICLES

William F. Feyrer, Bridgeport, Conn.

Application September 18, 1928
Serial No. 306,671

17 Claims. (Cl. 155—32)

This invention relates to motor vehicles, and more particularly to seat constructions therefor.

In motor vehicles, of the coach or coupe type particularly, the door through which one passes to the rear seat or seats is usually at least partially obstructed by the front seat next to the driver. To allow persons to enter the vehicle freely, the back-rest for the front seat next to the driver is arranged to tilt forwardly toward the seat proper which is so far forward of the door frame that persons of ordinary size may move between the seat and the door frame to the rear of the car even though the seat next to the driver is occupied.

To further improve the passage, the seat next to the driver is usually pivotally mounted on the floor so that it may, if unoccupied, be swung upwardly and forwardly after the back-rest has been swung downwardly on the seat. This does not, however, entirely remove the seat from in front of the door and when the seat is so folded it prevents the driver from entering the vehicle from the righthand or curb side of the car. Moreover, when the seat is in this folded condition, it has the additional disadvantage of blocking free access to certain important operating parts—namely, the emergency brake and the gear-shift lever, and hence it is unsafe to drive with the seat in such position.

An object of the present invention is to provide a seat or chair construction which may be easily and quickly removed from normal or operative position into a position preferably below the floor of the car to make possible absolutely free access to the interior of the car through the door not only for persons intending to ride in the back of the car but also for the driver who may then reach his seat without inconvenience when entering from the righthand or curb side of the car.

Another object of the present invention is to provide a seat construction preferably for the seat next to the driver whereby the seat may be caused to entirely disappear so that the space previously occupied by the seat may be utilized for carrying luggage, etc. A motor vehicle so constructed is particularly advantageous to travelers such as salesmen who can then easily store their sample cases and other luggage in the car without continually moving the seat forward and backward. It is also particularly advantageous for those who occasionally use passenger cars for camping and picnic trips as it provides a considerable storage space.

One of the principal features of the present invention from a practical standpoint is the provision of means whereby a "coach" may be easily and quickly converted into what is known as a "club coupe", the latter usually having at its front a single seat for the driver and at the rear a double seat for two or three passengers.

The objects and features above referred to are advantageously accomplished according to the present invention by the means illustrated and described herein, but it should be understood that the invention is not limited in all of its aspects to the specific construction shown and described, nor to the use of the invention in motor cars solely, for it may be advantageously used in airplanes and other kinds of conveyances.

Figure 1:
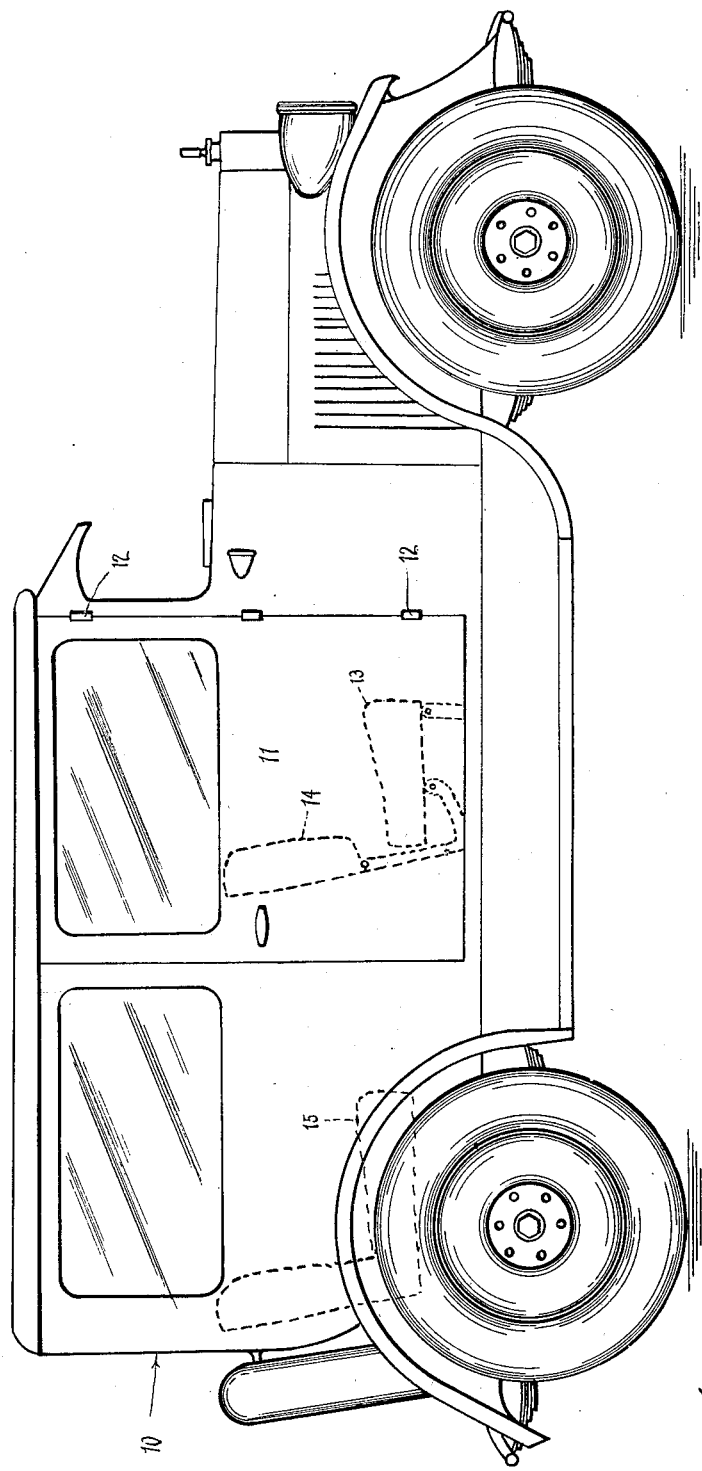
Figure 1 is a side view of a motor vehicle of the "coach" type showing the usual entrance door with relation to the seating arrangement, the disappearing seat of the present invention being shown in dotted lines.

Referring now to Figure 1, it will be noted that the car body 10 which is of the "coach" type is provided with a single relatively large door 11 opening forwardly on hinges 12, and that the seat 13 and its back-rest 14 is located directly in front of the door 11. The seat 13 and the back-rest 14 are usually so arranged that the back-rest can be swung downwardly and forwardly so as to lie over the seat 13 and allow a person of ordinary size to pass, with inconvenience, behind the seat to a rear seat 15. This is usually done when the seat 13 is occupied. When the seat 13 is not occupied, it is customary to swing the folded seat and back upwardly and forwardly so as to increase the facility with which the rear of the car may be entered.

As above stated, the seat 13 and its back-rest 14, when swung upwardly and forwardly for this purpose, block access to the driver's seat 16 from the righthand side of the car. In some cars the body is not provided with a door on the lefthand side and in some cases where the door is provided it cannot be opened due to carrying trunks, etc. on the lefthand running board. Therefore, it is necessary for the driver to return the seat 13 and back-rest 14 to normal position as shown in Figure 1, in order to reach the driver's seat 16 and this of course is a troublesome operation especially where the person such as a traveling salesman is continually getting in and out of the car. Moreover, when the seat 13 is swung upwardly and forwardly, it interferes with the operation of the emergency brake and frequently with the gear-shift lever so that the car cannot be driven with safety while the seat 13 is in that position.

The present invention provides means whereby the seat 13 and its back-rest 14 may be quickly and easily moved to a position where they are entirely out of the way. Notwithstanding this, the provision for folding down the back-rest 14 on the seat 13 is made, thereby retaining the advantage of permitting persons to enter the back of the car while the seat 13 is occupied.

The present invention not only removes the seat 13 and back-rest 14 to an out-of-the-way position, but actually causes them to disappear beneath the floor of the car so that the space usually occupied by the seat may be used for carrying luggage, etc. In addition to the above, the present invention provides means for closing the opening in the floor through which the seat passes when the seat is in operative and inoperative positions.

Referring now specifically to the physical embodiment of the present invention shown in the accompanying drawings, the seat 13 which is upholstered as usual is provided with a pair of depending ears 17 preferably located with respect to the seat at a point directly beneath the greatest weight on the seat, and these ears are pivotally connected at 17A to a pair of supporting plates 18 which are connected to a shaft 19 mounted in brackets 20 fastened to a pair of U-bars 21 extending longitudinally of the vehicle and mounted on or forming part of the chassis of the car.

The supporting plates 18 also carry the back-rest 14. This comprises a frame having interconnected side-bars 22 pivotally mounted at 23 and in a manner hereinafter described, on upwardly extending arms 24 of the supporting plates 18, and carrying between them an upholstered cushion 25.

The yoke or frame formed by the supporting plates 18 and shaft 19 constitutes the main controlling member of the device and in addition to supporting the seat 13 and carrying the back-rest 14 as stated, also supports a movable floor board 26 which closes an opening in the floor 28 of the vehicle through which the seat construction passes from inoperative to operative position and vice versa. For the purpose of supporting and controlling the floor-board 26, the plates 18 are provided with forwardly extending arms 29, each pivotally connected at 30 to an L-bar 31 forming a frame for the floor-board 26 upon which a suitable floor covering 32 is provided. Thus, it will be seen that the back-rest 14, the rear-end of the seat and rear-end of the floor-board are supported on the plates 18 and will move coordinately with the plates 18 and with each other.

Figure 2:
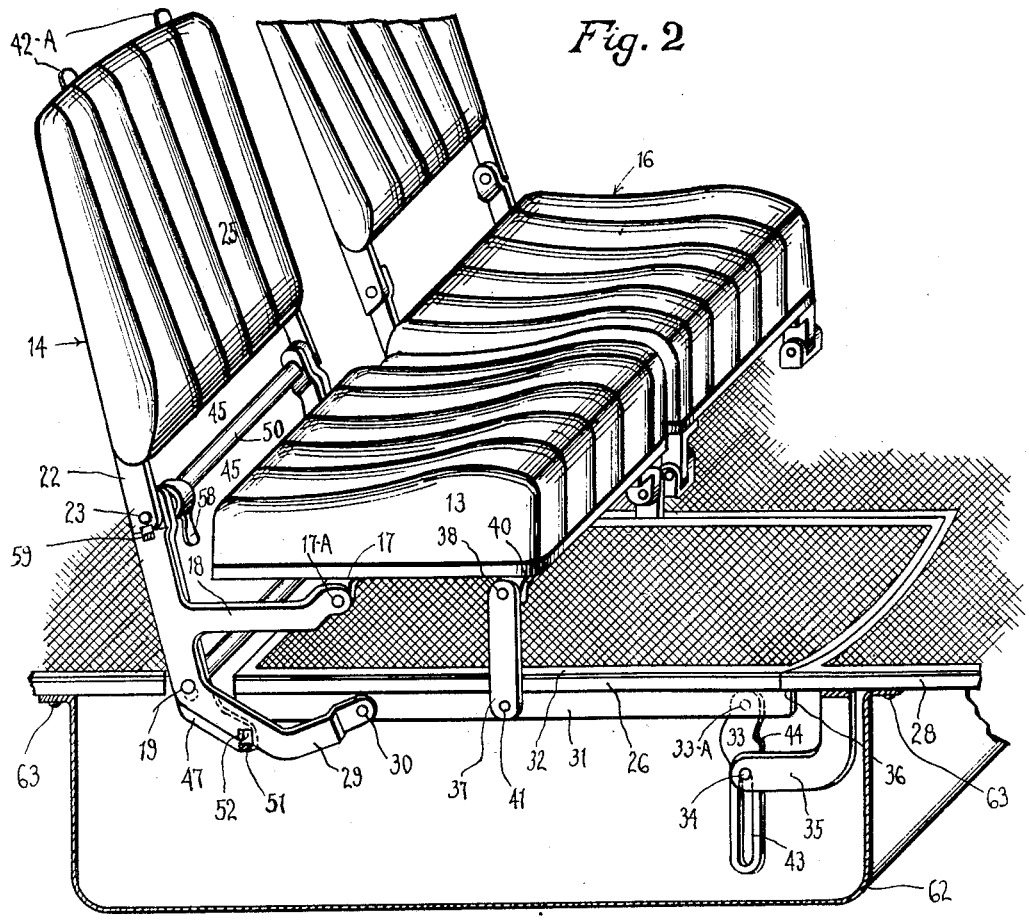
Figure 2 is a perspective view of the seat construction of the present invention, showing it applied to the seat next to the driver's seat, part of the construction being removed to show the underlying parts.

Considering the construction when in operative position shown in Figure 2, the forward end of the floor-board 26 is supported on a pair of links 33, one located at each side of the floor-board and pivoted at 33A on the L-bars 31 and at the other end engaging a stud 34 carried in an arm 35 which may be fixed either to the underside of the floor proper or preferably to the U-bars 21 forming part of the chassis as stated. Undesirable upward movement of the floor-board 26 from its operative position shown in Figure 2, or rattle while in this position, is prevented by the forward ends 36 of the L-bars 31 engaging the underside of the floor 28 of the car along the marginal edge of the opening which the floor-board 26 closes.

The floor-board 26 being thus mounted, supports the forward end of the seat 13, the latter having a pair of links 37 pivoted at 38 to angle-plates 40 on the under side of the seat and pivotally connected at 41 to the L-bars 31 of the floor-board frame.

Figure 4:
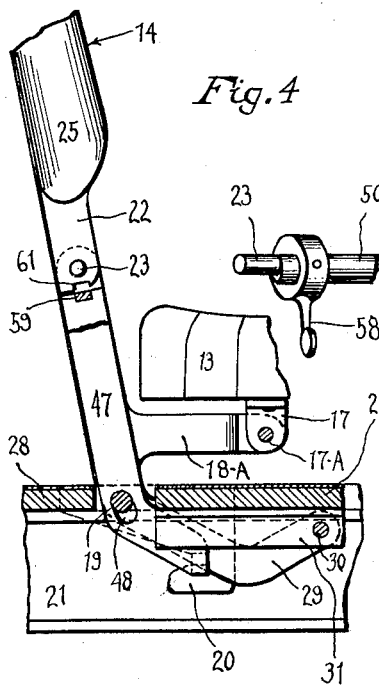
Figure 4 is a fragmentary side view partially in section showing the mechanism for locking the seat construction in normal or operative position.

Assuming for the moment that the back-rest bars 22 are not capable of hinging about the pivots 23 when the back-rest is swung downwardly and forwardly, as by grasping a rail 42 at the top thereof, the plates 18 and shaft 19 rotate clockwise as seen in Figures 2 and 4, moving the arms 18A and 29 first downwardly and then backwardly. This has the effect of first causing the floor-board 26 to move downwardly and then backwardly so as to move the pivot points 33A of the links 33 to the rear of the centers of the pins 34 and thus break the self-locking connection between the links 33 and studs 34 which hold the forward end of the floor-board elevated when the pivot points 33A are directly above or slightly forward of the pins 34.

As the swinging movement is continued, the rear end of the floor board 26 is caused to move downwardly and rearwardly and similar movement is permitted the forward end of the floor 26 by means of the elongated slot 43 in each link 33 which, during this movement, rides on the studs 34. The downward movement of the floor board 26 is limited, for instance in the position shown in Figure 3 by the forward ends of the floor board or the L-bars 31, engaging the notches 44 at the side edges of the links and the ends of the slots 43 engaging the studs 34. Further, downward movement of the back rest is estopped and this is substantially supported by ears 42A of the bar support 42B overlapping and engaging the top of the floor proper, as shown in Figure 3.

Figure 3:
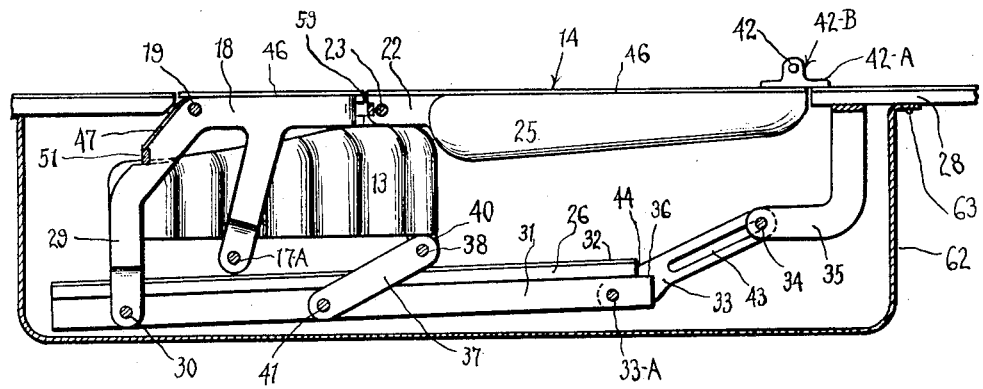
Figure 3 is a side elevation of the seat construction shown in the position that the parts assume when the seat is caused to disappear beneath the floor of the car and after the auxiliary floor has closed the opening through which the seat has moved, the protective casing for the parts while in such position being shown in section.

As the plates 18 swing and the floor 26 descends, the seat 13 is carried down and back by means of the arms 18A carrying the rear of the seat and the links 37 carried by the floor-board 26 until it is in the position shown in Figure 3 where it lies close to the floor 26.

During the described movements of the plates 18, the back rest 14 is brought down to a position where it is substantially level with the floor 28. The back-rest 14 and yoke constituted by the plates 18 are made substantially the size of the opening in the floor, normally closed by the floorboard 26. The perimeter of this back-rest comprises a sheet metal or other suitable support 45 between the plates 18 and sidebars 22 and upon this there is provided a suitable covering 46, thus constituting an auxiliary floor completely closing the opening through which the seat 13 passes. When in closed position, the auxiliary floor provides a clear space for movement into and out of the car and also provides additional space to receive luggage etc.

Although it is not essential, it is preferable that the shaft 19 be so located with relation to the floor 28 and the dimensions of the moving parts be such that the auxiliary floor formed by the back-rest is substantially level and coextensive with the floor 28 when the seat is in its inoperative position shown in Figure 3.

To move the seat 13 to operative position again, it is merely necessary to grasp the rail 42 and swing the auxiliary floor upwardly and rearwardly about the axis of the shaft 19 to the limit of its movement when the projection 36 of the floor L-bars 31 extends under the margin of the floor 28 and the pivot points 33A of the links 33 are located above the studs 34. At this time the pivot points 38 of the links 37 are directly above the pivot points 41 at which the links 37 are connected to L-bars 31 of the floor 26 and hence there is no tendency for the forward end of the seat to tilt downwardly so long as the floor board 26 is not permitted to move.

According to the present invention a novel arrangement of parts is provided for controlling the positioning of the chair in either operative or inoperative position. In the present preferred embodiment, the chair which comprises the seat 13 and back-rest 14 is locked in the operative position above described by a pair of locking-plates 47 each lying adjacent one of the supporting plates 18. Each locking-plate 47 is provided with an elongated slot 48 embracing the shaft 19 and its upper end is provided with a bolt 59 movable in an oblong aperture 60 in the end of the arm portion 24 of the supporting plate 18 and an elongated slot 49 embracing a rocker-shaft 50 mounted in the arms 24 forming an integral part of the supporting plates 18. Thus, the locking plates move as a unit with the plates 18 and back-rest 14.

To lock the seat 13 and the movable floor-board 26 in operative position, the lower end of each locking-plate 47 is provided with a bolt 51 slidable in an aperture 52 provided in the arm 29 of the adjacent supporting plate 18. This bolt extends beyond the plate 18 and is adapted to engage a socket 53 in the pivot rod bracket 20 secured on the U-bar 21 by screws 55 or otherwise. When the bolts 51 engage the sockets 53, they securely hold the plates against movement for they simultaneously engage and are embraced by the walls of the slots 52 in the plates 18. Any tendency for the auxiliary chair to collapse is thus prevented by the bolt 51 engaging the lug 56 defining the rear end of the slot 53. The lug 56 is chamfered to permit the bolt 51 to easily slide up and over it when the chair is being moved to operative position.

Figure 5:
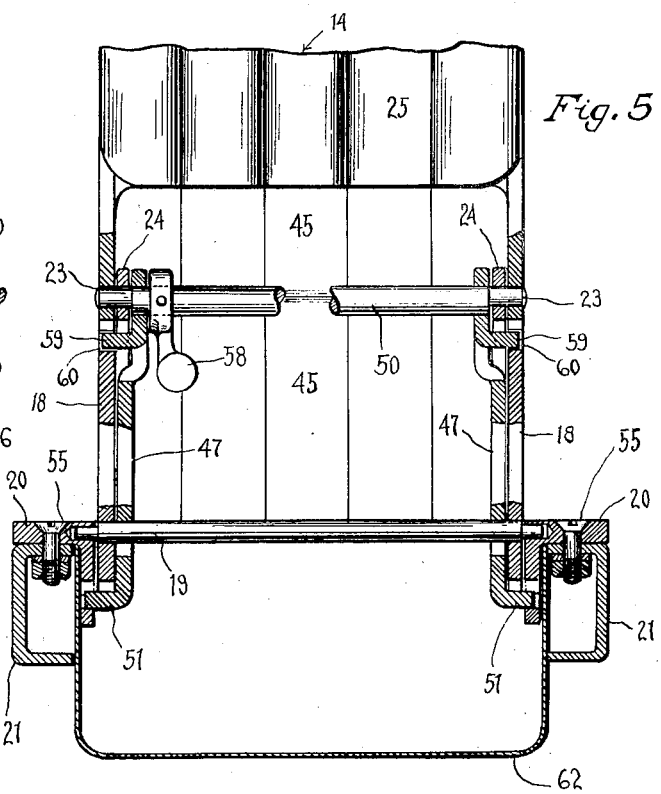
Figure 5 is a transverse sectional view showing part of the operating mechanism in position for locking the seat in operative position and for allowing pivotal forward movement of the back-rest.
Figure 6:
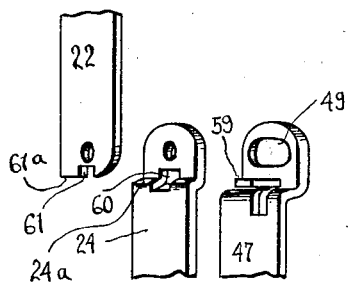
Figure 6 is a disassembled perspective view of the hinge and lock connection between the back-rest portion and the supporting members therefor, taken at side "A" in Figure 5.
Figure 7:
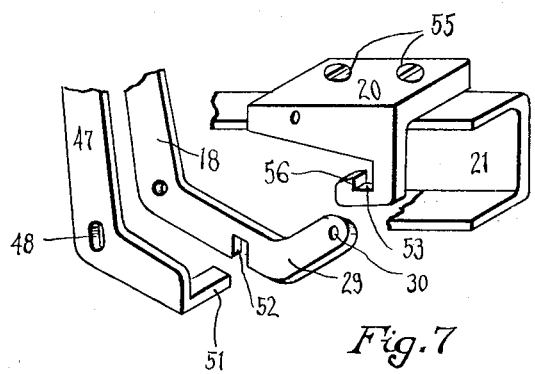
Figure 7 is a disassembled perspective view showing the hinge and lock connection between the supporting members for the seat and back-rest and the car body taken at side "B" in Figure 5.

The position of the locking-plates 47 and thus the bolts 51 are controlled by the shaft 50 which has eccentrical trunnions 23 and which is provided with an operating handle or lever 58. When the shaft 50 is rocked by movement of the operating handle 58 from its downwardly extending position shown in Figures 2, 4 and 5, to its upwardly extending position shown in Figure 3, the shaft 50 through its connection with the slot 49 and due to the eccentrically placed trunnions 23 raises the locking-plates 47. This raises the bolts 51 out of the sockets 53 so that the chair may be collapsed and moved to inoperative position. The return movement of the operating handle 58 causes the bolt to again descend in the stationary socket and lock the chair in operative position.

In order to lock the back 14 and the yoke constituted by the plates 18 together against relative movement when the parts are moved to cause the chair to disappear, the upper ends of the locking-plates 47 are each provided with a bolt 59 which moves in the slot 60 in the end of the arm 24 into a position to engage a notch or cut-out 61 in the lower end of the bars 22 of the back 14. When the locking plates are raised by the operating handle 58 to release the bolts 51 from the sockets 53 to allow the chair to collapse and disappear, the bolts 59 are moved into the notches 61 to lock the folding back 14 against rotating movement on the trunnions 25 or against any other movement relative to the supporting plates 18. The parts are thus locked together while the chair is in inoperative position and prevent sagging of the auxiliary floor in the vicinity of the shaft 50 which might otherwise occur were the locks not provided. This strain is also partially absorbed by the flat portion 61a of the arm 22 engaging the flat top portion 24a of the arm 24, this feature also serves to limit arcuate movement of the back-rest and properly aligns the slot 61 with the traveling bolt 59.

From the foregoing it will be seen that the present invention provides a collapsible seat construction which may be easily and quickly locked in an operative position and maintain a movable floor-board, which substantially closes an aperture in the floor, in a locked position level with the surrounding floor while retaining the advantage of allowing arcuate movement of the back-rest.

Further, according to the present invention, means are provided to quickly change the chair and the movable floor-board from a locked operative position to an unlocked condition, at the same time locking the back-rest with respect to the seat supports to allow pivotal movement of the seat and floor-board from an operative position through an aperture in the floor to a small and compact collapsed condition below the floor at the same time substantially closing said aperture with the chair, substantially level with the surrounding floor. All of these advantages are obtained with a comparatively simple arrangement of parts.

From the viewpoint of simplicity it should also be noted that the chair and floor-board may be extraneously assembled as a unit and placed bodily in the car, to be fastened in place by the simple expedient of tightening the bracket screws 55 in place and tightening the studs 34 within the elongated slots 43, but a momentary task.

After the chair is assembled in place, a dust-shield 62 is fastened to the underside of the floor 28 by screws 63 or other suitable means to protect the chair from dust and dirt when it is in collapsed or inoperative position.

While the invention has been described as embodying certain features of construction and arrangement of parts, and adapted for a certain kind of use, it should be understood that its use is equally applicable to airplanes and divers application, accordingly variations and modifications may be made within the scope of my invention, and portions of the improvements may be used without others.

What is claimed as new and for which it is desired to obtain Letters Patent, is:

1. In a passenger-carrier, an apertured floor; a seat movable from operative position above the level of the floor through said aperture to an inoperative position below the level of the floor; a floor-board for closing said aperture, means for connecting the seat to the floor board so that the latter is movable from a position substantially level with the floor to a position below the level of the floor when said seat is moved from operative position above the level of the floor to inoperative position below the level of the floor and for effecting automatic relative movement of both the seat and floor-board into the fully operative position; and a back-rest for the seat movable from operative position in the back of the seat into a position to close the aperture in the floor through which the seat passes in going to inoperative position.

2. In a passenger-carrier, an apertured floor; a seat movable from operative position above the level of the floor through said aperture to an inoperative position below the level of the floor; a floor-board movable in said aperture from a position substantially level with the floor to a position below the level of the floor when said seat is moved from operative position to said inoperative position; a back-rest for the seat, means for mounting the back rest for movement from operative position in back of the seat to a position to close the aperture in the floor through which the seat and floor-board pass; and means interconnecting the seat, floor-board, and back-rest for conjoint movement from fully operative to fully inoperative position and vice-versa.

3. In a passenger-carrier, an apertured floor; a seat movable from operative position above the level of the floor through said aperture to an inoperative position below the level of the floor; a floor-board for closing said aperture movable from a position substantially level with the floor to a position below the level of the floor; a back-rest for the seat means for mounting the back-rest for movement from operative position in back of the seat to a position to close the aperture in the floor through which the said seat and said floor-board passes; and means for operatively connecting the floor-board and seat and connecting them to the back-rest so that when the latter is swung downwardly and forwardly the floor-board and seat each move to inoperative position relative to each other and below the floor level and the back-rest moves to a position to close the aperture through which the floor board and seat pass in moving to inoperative position.

4. In a passenger-carrier, an apertured floor; a seat movable from operative position above the level of the floor through said aperture to an inoperative position below the level of the floor; a floor-board for closing said aperture when the seat is in operative position, movable from a position substantially level with the floor to a position below the level of the floor; a back-rest for the seat means for mounting the back rest for movement from operative position in back of the seat to a position to close the aperture in the floor through which the seat and the floor-board pass; means for operatively connecting the floor-board and seat to the back-rest so that when the latter is swung downwardly and forwardly the floor-board and seat each moves to inoperative position below the floor level and the back-rest moves into position to close the aperture through which the floor-board and seat pass in moving to inoperative position; and means for positively locking the floor-board and seat in fully operative position above the floor level.

5. In combination, an apertured floor; a folding seat having an operative position above the level of the floor and an inoperative position below the level of the floor; a movable back-rest for said seat having an operative and inoperative position relative to the seat and relative to the apertured floor; a floor-board for closing said aperture when the seat and back-rest are in the operative position; and means for locking said seat and floor-board in fully operative position while permitting movement of the back-rest to inoperative position relative to the seat.

6. In combination, an apertured floor; a folding seat; a back-rest for the seat movable to predetermined positions; a pivotal support for the back rest substantially level with the floor; a floor-board; and means interconnecting said seat, back-rest and floor board adapted to move the floor-board into floor closing position in said aperture, and the seat into fully operative position automatically and in a single operation when said back-rest is moved to a predetermined position.

7. In combination, an apertured floor; a folding seat having an operative and inoperative position; a movable floor-board having an operative and an inoperative position; a back-rest for the seat pivotally mounted at the level of the floor adapted to close said aperture when said seat and floor-board are moved to inoperative position; and means for automatically moving the seat substantially parallel with the back-rest as the latter is moved to inoperative position.

8. In combination, an apertured floor; a seat movable to and from operative and inoperative positions; a floor-board interconnected with said seat and likewise movable to and from operative and inoperative positions; a back-rest for the seat pivotally mounted near the level of the floor and movable to and from operative and inoperative positions the said back-rest comprising a supporting section and a back-rest pad section pivotally connected substantially midway of its length; and means for locking the said seat, floor-board and back-rest support section in operative position and allow pivotal movement of the back-rest pad section.

9. In combination, an apertured floor; a seat movable to and from operative and inoperative positions; a floor-board interconnected with said seat and likewise movable to and from operative and inoperative positions; a back-rest for the seat movable to and from operative and inoperative positions the said back-rest comprising a supporting section and a back-rest pad section pivotally connected substantially midway of its length; and means for locking the said seat, floor-board and back-rest support in operative position and allowing pivoted movement of the back-rest pad section, said means also adapted to unlock said seat, floor-board and back-rest support section while at the same time locking said back-rest pad-section with respect to the support section to allow and facilitate movement of the seat and floor-board to inoperative position.

10. In combination, an apertured floor; a seat; a back rest for said seat; a floor board and a main supporting means interconnecting said seat, back rest and floor board, mounted near the floor level, at one end of said aperture, and adapted to move the floor-board and seat into operative position as the back-rest is moved to operative position.

11. In combination, an apertured floor; a cushioned seat; a back rest for said seat, having a cushioned section and an uncushioned section; means to move and maintain said seat and back rest in an operative position above the level of the floor at substantially a right angle to each other; an inoperative position for said seat and back-rest substantially below the level of the floor; said means adapted to move the cushioned seat from the right angle position with respect to the back rest to a position parallel with and offset with relation to the uncushioned section of the back rest when said seat and back rest are moved to inoperative position.

12. In combination, an apertured floor; a cushioned seat; a back-rest for said seat having an operative and inoperative position and having a cushioned section and an uncushioned section; a storage compartment for said seat and back-rest; and means interconnecting said seat and back-rest adapted to move the seat into an operative position above the level of the floor at substantially a right angle to the back-rest and to an inoperative position below the level of the floor in the storage compartment and to nest the cushioned section of the back-rest and cushioned seat end-for-end therein as the back-rest is moved to inoperative position.

13. In combination, an apertured floor; a seat; a back-rest for the seat having an operative and an inoperative position; a main pivot for said back-rest, near the level of the floor; a seat member; a floor-board; and means for automatically moving said seat member and floor-board into an operative position, in a single operation, as the back-rest is moved about its main pivot into operative position.

14. In combination, an apertured floor; a seat; a back-rest for the seat having an operative and an inoperative position; a main pivot for said back-rest, near the level of the floor; a seat member; a floor-board; and means for automatically moving said seat member and floor-board into an inoperative position, in a single operation, as the back-rest is moved about its main pivot into inoperative position.

15. In combination, an apertured floor; a seat; a back-rest for the seat; a floor-board having an operative and inoperative position; and means, interconnecting said seat, back-rest, and floor-board, adapted to support said parts relative to the apertured floor and adapted to simultaneously move said parts, in a single operation, into either an operative position or into an inoperative position as the back-rest is moved to its operative and inoperative positions.

16. In combination, an apertured floor; a seat; a back-rest for the seat having an operative and an inoperative position; a main pivot for said back-rest, near the level of the floor; a seat member; a floor-board; and means for automatically moving said seat member and floor-board into an inoperative position, in a single operation, as the back-rest is moved about its main pivot into inoperative position, said back-rest serving as an auxiliary floor-board to close the apertured floor when in its inoperative position.

17. In combination, a seat; a back-rest for the seat; a back-rest supporting section; a floor-board; supporting means for said seat, floor-board back-rest, and including the back-rest supporting section; and locking means having a plurality of locking stations, adapted to lock the seat, supporting section and floor-board in one of its stations, and lock the supporting section and back-rest together in another of its stations.

WILLIAM F. FEYRER.